(12) United States Patent
Schmitt et al.

(10) Patent No.: US 9,822,879 B2
(45) Date of Patent: Nov. 21, 2017

(54) FLAT SEAL HAVING A SOLID BEAD

(75) Inventors: Klaus Schmitt, Grunebach (DE); Burkhard Schneider, Neunkirchen (DE)

(73) Assignee: Federal-Mogul Sealing Systems, Herdorf (DE)

( * ) Notice: Subject to any disclaimer, the term of this patent is extended or adjusted under 35 U.S.C. 154(b) by 691 days.

(21) Appl. No.: 13/379,112

(22) PCT Filed: Jun. 25, 2010

(86) PCT No.: PCT/EP2010/059074
§ 371 (c)(1),
(2), (4) Date: Dec. 19, 2011

(87) PCT Pub. No.: WO2010/149774
PCT Pub. Date: Dec. 29, 2010

(65) Prior Publication Data
US 2012/0098210 A1    Apr. 26, 2012

(30) Foreign Application Priority Data
Jun. 25, 2009 (DE) .................. 10 2009 030 559

(51) Int. Cl.
*F16J 15/08* (2006.01)

(52) U.S. Cl.
CPC ................ *F16J 15/0818* (2013.01)

(58) Field of Classification Search
CPC .. F16J 15/0818; F16J 15/0856; F16J 15/0825; F16J 15/123; F16J 15/0887
USPC ................. 277/591–595, 601, 639
See application file for complete search history.

(56) References Cited

U.S. PATENT DOCUMENTS

| | | | |
|---|---|---|---|
| 4,861,047 A | 8/1989 | Okano | |
| 5,222,745 A | 6/1993 | Akbar et al. | |
| 5,232,229 A * | 8/1993 | Udagawa | F16J 15/0825 277/595 |
| 5,516,124 A * | 5/1996 | Kubouchi | F16J 15/0825 277/595 |
| 5,803,465 A * | 9/1998 | Schweiger | F16J 15/123 277/593 |
| 6,002,697 A * | 12/1999 | Govorkov | G02F 1/3501 372/22 |

(Continued)

FOREIGN PATENT DOCUMENTS

| | | |
|---|---|---|
| DE | 10219526 A1 | 9/2001 |
| DE | 20 121 984 | 11/2003 |

(Continued)

*Primary Examiner* — Kristina Fulton
*Assistant Examiner* — L. Susmitha Koneru
(74) *Attorney, Agent, or Firm* — Robert L. Stearns; Dickinson Wright, PLLC

(57) ABSTRACT

A metallic flat gasket with a solid bead has at least one metallic layer (2), wherein the metallic gasket comprises at least one solid bead (6), which is formed in at least one layer (2) of the metallic gasket, wherein the solid bead (6) comprises two flanks (8, 10) lying opposite one another. The gasket comprises, between the two flanks (8, 10) in the circumferential direction of the solid bead (6), at least one row (12, 14, 16) of adjacent depressions or bead sections (18, 20, 22), which in each case form an integral contour with the solid bead (6) and are orientated in the opposite direction with respect to the solid bead (6).

13 Claims, 11 Drawing Sheets

(56) References Cited

U.S. PATENT DOCUMENTS

| | | | |
|---|---|---|---|
| 6,250,645 B1* | 6/2001 | Udagawa | F16J 15/0818 |
| | | | 277/592 |
| 6,279,916 B1* | 8/2001 | Stecher | F16J 15/122 |
| | | | 277/592 |
| 6,769,696 B2* | 8/2004 | Diez | F16J 15/0825 |
| | | | 277/593 |
| 6,814,357 B2 | 11/2004 | Diez et al. | |
| 7,490,835 B2 | 2/2009 | Diez et al. | |
| 7,527,269 B2 | 5/2009 | Tiefenbach et al. | |
| 7,802,797 B2* | 9/2010 | Flemming | F16J 15/0818 |
| | | | 277/593 |
| 7,819,625 B2* | 10/2010 | Merrill | F01D 9/06 |
| | | | 415/170.1 |
| 8,371,587 B2* | 2/2013 | Fly | H01M 8/0276 |
| | | | 277/594 |
| 8,496,253 B2 | 7/2013 | Goettler et al. | |
| 8,616,557 B2* | 12/2013 | Lafrenz | F16J 15/0825 |
| | | | 277/593 |
| 8,752,841 B2 | 6/2014 | Davidson et al. | |
| 2004/0160017 A1* | 8/2004 | Diez et al. | 277/593 |
| 2007/0013145 A1* | 1/2007 | Detmann | F16J 15/0818 |
| | | | 277/593 |
| 2008/0093808 A1* | 4/2008 | Quick | B23K 26/0084 |
| | | | 277/595 |
| 2009/0224486 A1 | 9/2009 | Tiefenbach et al. | |
| 2010/0176558 A1* | 7/2010 | Egloff | F16J 15/0818 |
| | | | 277/591 |
| 2011/0001295 A1* | 1/2011 | Egloff | F16J 15/0825 |
| | | | 277/592 |
| 2014/0175754 A1* | 6/2014 | Nakaniwa | F16J 15/4472 |
| | | | 277/418 |

FOREIGN PATENT DOCUMENTS

| | | |
|---|---|---|
| DE | 10 2004061 964 A1 | 12/2004 |
| DE | 10 2004 034824 A1 | 2/2006 |
| DE | 102006047424 | 10/2006 |
| DE | 60 2004 011452 T2 | 1/2009 |
| EP | 1 637 780 A1 | 3/2006 |

* cited by examiner

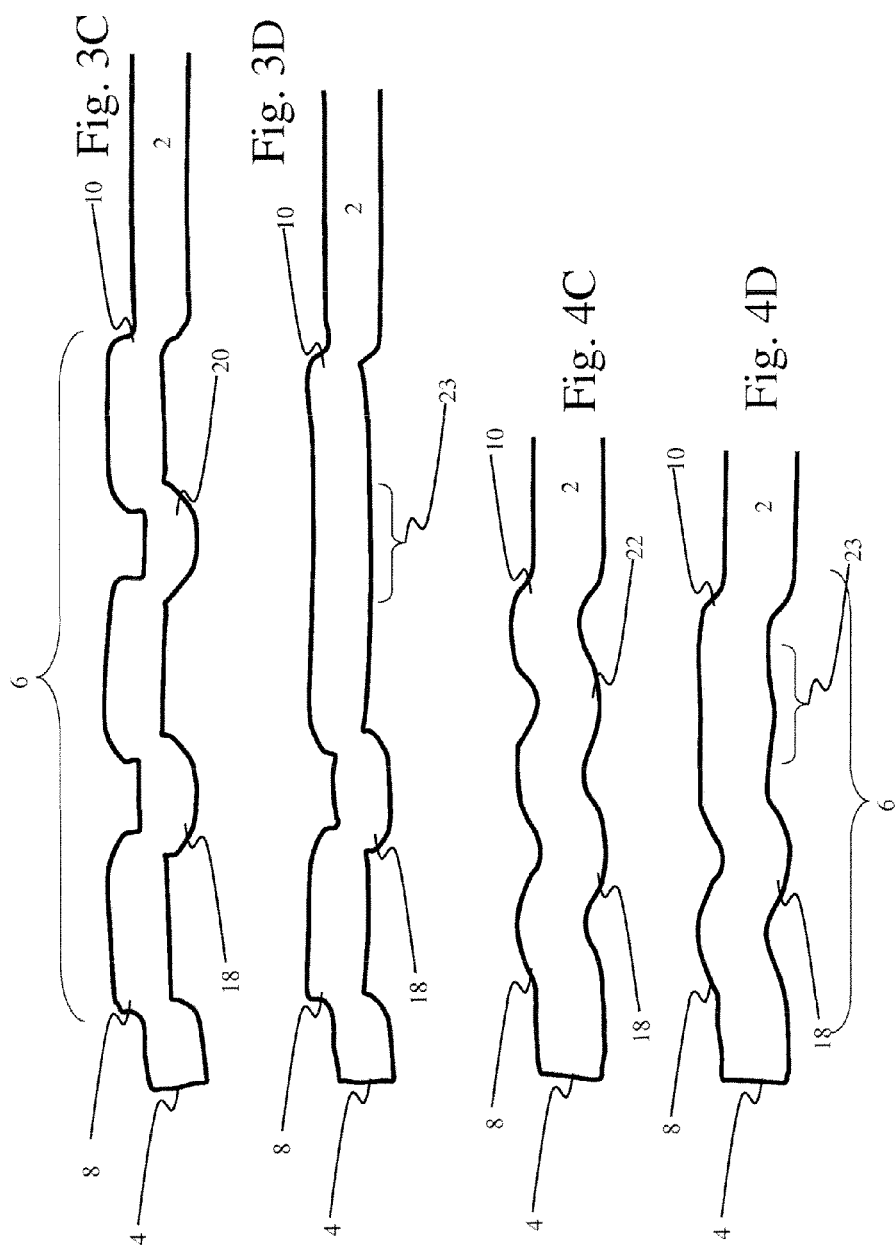

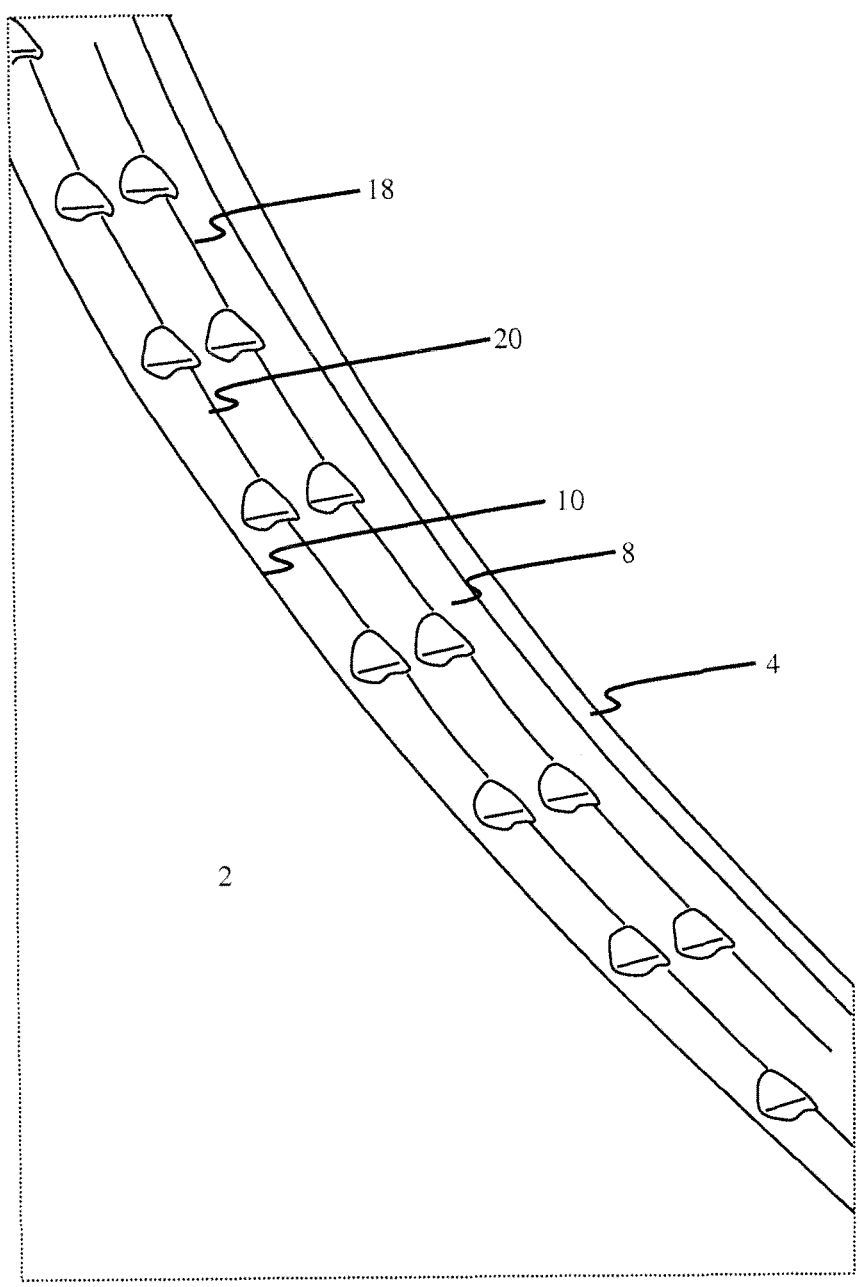

FLAT SEAL HAVING A SOLID BEAD

BACKGROUND OF THE INVENTION

1. Technical Field

The present invention relates to metallic flat gaskets with solid beads. Furthermore, the present invention relates to gaskets with sealing beads which are protected against compression. Furthermore, the present invention relates to metallic cylinder head gaskets.

2. Related Art

Various flat gaskets with and without stoppers are known from the prior art.

Document DE10217526 A1 relates to a metallic gasket with a stopper layer, which is constituted as a checkered embossment in a layer of the metallic gasket.

Document US 2004/0160017 A1 relates to a metallic gasket with a stopper layer, which is constituted as a honeycomb embossment in a layer of the metallic gasket.

Offenlegungsschrift DE 10 2004 061 964 A1 relates to a gasket with a stopper layer constituted in the form of ring segments, wherein the individual ring segments are constituted as separate layers.

There is known from document DE 102 006 047 424 a corrugated deformation limiter, which is constituted as a corrugated embossment in a metallic layer.

There is known from document DE 20 121 984 a corrugated deformation limiter, which is constituted as a corrugated embossment in a metallic layer and which is referred to in this document as a wave stopper.

In the past, wave stoppers have been constituted, amongst other things, as beads which are disposed in a circular manner around a sealing region, i.e. around a solid bead or inside a solid bead. These beads previously formed closed circles or loops, conventional beads only being able to produce a compression effect in one dimension, i.e. normal to the course of the bead.

SUMMARY OF THE INVENTION

The problem underlying the present invention is to improve the compression properties of sealing regions that are constituted as solid beads.

Furthermore, it is desirable for the material from which the wave stopper is produced to be constituted thinner without impairing the properties of the gasket. In addition, it is desirable to reduce the production costs for the tool with which a gasket according to the invention can be produced.

In an embodiment of the present invention, a metallic flat gasket is made available with at least one layer and one solid bead. The metallic gasket comprises at least one solid bead, which is formed in the least one layer of the metallic gasket. The solid bead comprises two flanks lying opposite one another. Between the two flanks of the solid bead, the gasket comprises, in the circumferential direction of the solid bead, at least one row of adjacent bead sections or depressions, which in each case form an integral contour with the solid bead and are orientated in the opposite direction with respect to the solid bead.

The row of adjacent bead sections or depressions is directed in the opposite direction to the solid bead and can support the solid bead, so that complete flattening of the solid bead can be prevented. The row of adjacent depressions or bead sections runs partially or for the most part parallel to the solid bead. The depressions form, so to speak, "counter-beads" with respect to the solid bead. The depressions are directed in the opposite direction to the solid bead and are embossed in the metallic layer. The row of adjacent depressions is directed in the opposite direction to the solid bead and can limit the compression of the solid bead, whereby the depressions support the back of the solid bead in the direction of indentation of the solid bead. The expression "depression" is intended to denote a depression which arches on the other side of the layer and does not merely represent an embossment, which would only correspond to a thinning of the layer. In particular, the expression "depression" is intended to denote a deformation of the sheet metal, which in a cross-section essentially corresponds to the cross-section of the solid bead. The depressions can therefore be constituted for example as bead sections or point-like beads.

In a further embodiment of the present invention, the gasket comprises two adjacent rows of depressions running in parallel.

In a special embodiment, the depressions are disposed parallel to one another on adjacent rows, and not offset with respect to one another. The cost of the production of a pressing tool can be reduced by depressions that are not disposed offset with respect to one another.

The depressions on adjacent rows can also be disposed independently of one another along the rows. In an embodiment, the depressions on adjacent rows are disposed offset with respect to one another, which enables a more uniform support of the solid bead.

In a further embodiment of the present invention, the gasket comprises three adjacent rows of depressions running in parallel.

In a further embodiment of the present invention, the gasket comprises four adjacent rows of depressions running in parallel.

In another embodiment of the present invention, the solid bead and the rows of depressions run at least partially on circular arcs. Provision is also made such that the solid bead and the rows of depressions form concentric circles, or lie on concentric circular arcs.

In an additional embodiment, the depressions disposed on a circular arc essentially have a length which corresponds to a centre-point angle between 2° and 4°. This means that depressions can be disposed of a full circle between approx. 50 and 180. The depressions, which can for example be constituted as bead sections, can preferably be constituted in length roughly twice to eight times, preferably three to six times and more preferably four to five times as long as in their width.

In a further embodiment of the metallic flat gasket according to the invention, the depressions of a row of depressions essentially have the same width and the same length.

In another additional embodiment of the metallic flat gasket according to the invention, at least two adjacent rows of depressions have the same number of depressions.

In a further embodiment of the present invention, the flanks of at least some depressions, or the layer in the region of the flanks of at least some depressions, essentially have the same thickness as the metallic layer. According to this embodiment, the thickness of the layer in the region of the depressions should be kept essentially constant. According to a further embodiment, the thickness of the layer in the region of the flanks of the solid bead should essentially be equal to the thickness of the metallic layer.

According to another embodiment, the depressions are constituted corrugated in cross-section or in the form of a round wave in each case.

In a further embodiment of the metallic flat gasket, at least some of the depressions are tapered in the region of its flanks compared to the thickness of the metallic layer.

According to this embodiment, the thickness of the layer should be tapered in the region of the depressions. According to an embodiment, the thickness of the layer should be essentially tapered in the region of the flanks of the solid bead and thus lie within the thickness of the layer.

According to a further embodiment, the depressions are trapezoidal in cross-section. In the case of trapezoidal beads, a tapering of the flanks of the solid bead and/or of the depressions can be achieved by a shearing embossment.

By changing the taper of the flanks of the solid bead and/or of the depressions, the properties can be adapted according to the requirements of the use of the flat gasket.

According to a further embodiment of the metallic flat gasket, the latter comprises at least one through-hole, such as a combustion chamber aperture, which is surrounded by the solid bead and the at least one row of depressions.

Provision is also made to use the flat gasket to seal a fluid-filled chamber such as oil or gas or a vacuum. The through-hole is not necessary for the inventive effect of the gasket according to the invention, since a gasket can also be used solely as a closure of a hole. In this case, a gasket without a through-hole can if need be provide a better seal, since only a single sealing face has to be sealed.

In an additional exemplary embodiment, the metallic flat gasket further comprises at least one additional row of depressions which is not disposed between the flanks of a solid bead. In these regions, a plurality of depressions disposed one behind the other and beside one another is disposed along a plurality of lines running essentially in parallel. The depressions on adjacent lines can in each case be disposed offset with respect to one another. The depressions on adjacent lines can be disposed in each case in parallel and not offset with respect to one another. The individual depressions can thus fill an area on a layer of the metallic flat gasket that can in principle be formed arbitrarily. In a further embodiment, the individual depressions can be constituted straight and disposed tangential along a curve or a circular arc.

In a further exemplary embodiment of the metallic flat gasket, no depressions are disposed in at least one predetermined circular sector on a first row of depressions which runs along the first circular arc. In addition, in this embodiment, depressions are disposed in at least a second circular sector on a second row of depressions which runs along a second concentric circular arc with a different radius from the first circular arc, whereby no depressions are disposed on the first circular arc. Furthermore, in this embodiment, no depressions are disposed in at least one circular sector on the second row of depressions which lie on the second concentric circular arc, whereas depressions are disposed in this sector on the first circular arc.

This embodiment is suitable, through a plurality of circular-arc sections running only in sectors, for compensating for deviations from the circular shape, for example combustion chamber convex portions and corresponding convex portions of the solid bead. This can be achieved by the fact that, in the region in which for example a circle of depressions arranged in a row is interrupted by a combustion chamber convex portion, an additional circular arc is provided which runs in the sector of the interruption, the width of the solid bead being uniformly filled with depressions. The depressions can thus be adapted to any shape or to any course of the solid bead.

In a further exemplary embodiment of the present invention, the through-hole is provided with convex portions and the solid bead runs around this convex portion. In this embodiment, at least one circular arc with a row of depressions disposed thereon is interrupted in the region of the convex portion of the solid bead at the (at least one) concave portion. This (at least one) absent circular arc and the depressions absent in this region are compensated for by (at least one) row of depressions disposed additionally in the solid bead externally at an outer convex portion of the solid bead and lying on a circular arc. This thus prevents the effect of the depressions being weakened in their function by narrower regions.

Provision is also made to vary the height, the width and the length of the depressions within a row or between adjacent rows, in order to avoid, for example, load peaks at the flank of the solid bead.

In a further exemplary embodiment, the depressions are constituted as a point-like bead or dent, Y-, X-, V-, cross-shaped, star-shaped or triangular, rectangular, heptagonal or hexagonal depressions or an annular bead.

In a further embodiment, the metallic flat gasket is a cylinder head gasket for an internal combustion engine.

According to another aspect of the present invention, an embossing/pressing tool is made available for the production of a metallic flat gasket such as described above. The embossing/pressing tool according to the invention is constituted such that it can provide at least one layer of a flat gasket according to the invention with a solid bead and with at least one row of depressions, such as is described above. The tool is preferably also provided with structures which stamp out through-holes, and can print, press or emboss further sealing beads in layers of a metallic flat gasket.

THE DRAWINGS

The invention is represented in the drawing with the aid of various embodiments of metallic gaskets according to the invention as compared to the prior art.

Figure 3A:
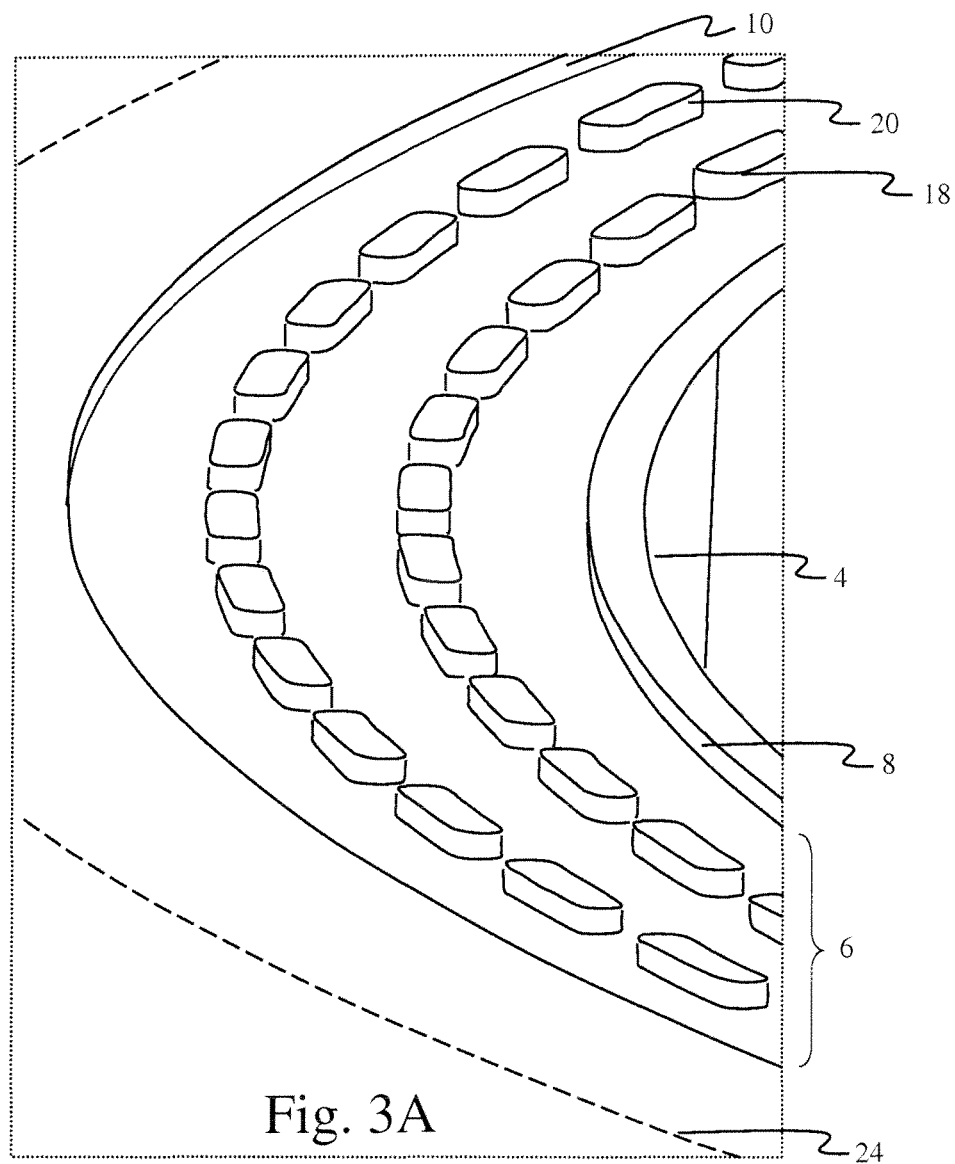

FIGS. 3A, 3A', 3B, 3C and 3D show various views of an embodiment of a gasket according to the invention with a solid bead, which is supported by two rows of depressions constituted as bead sections.

FIGS. 4A to 4D show various views of another embodiment of a gasket according to the invention with a solid bead, which is supported by two rows of depressions constituted as bead sections.

Figure 5:
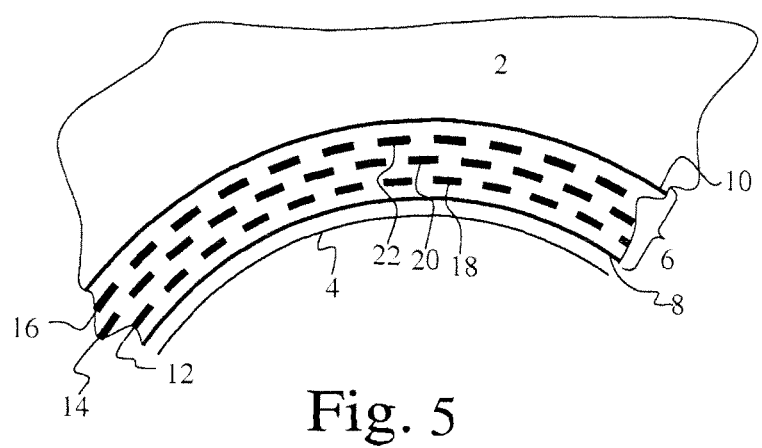

FIG. 5 shows a plan view of a detail of a gasket according to the invention with a solid bead, which is supported by three rows of depressions constituted as bead sections.

Figure 6:
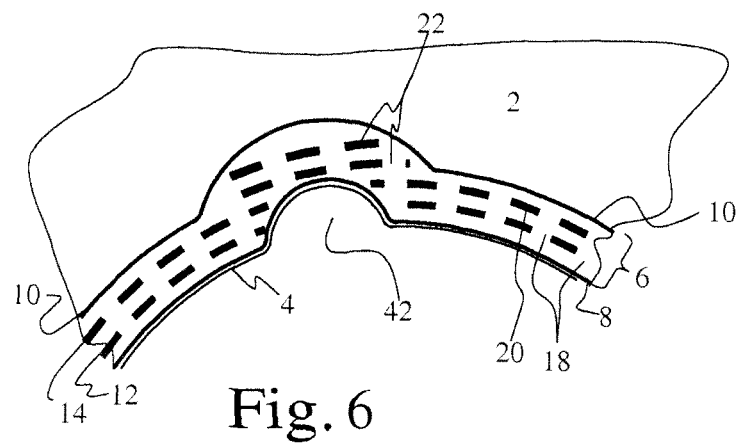

FIG. 6 shows an embodiment of a gasket according to the invention, with a combustion chamber convex portion with a convex portion of the solid bead and an arrangement of bead sections which compensates for the convex portion of the solid bead.

Figure 7A:
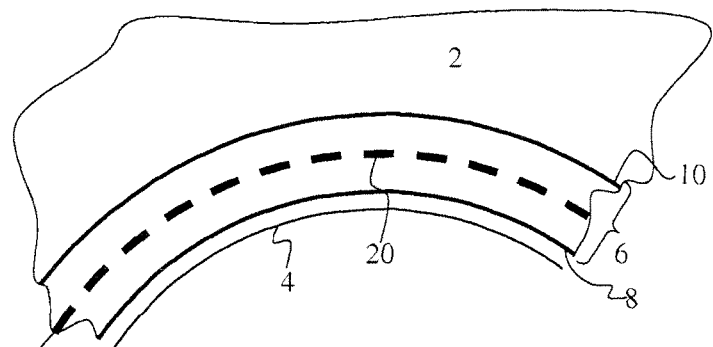
Figure 7B:
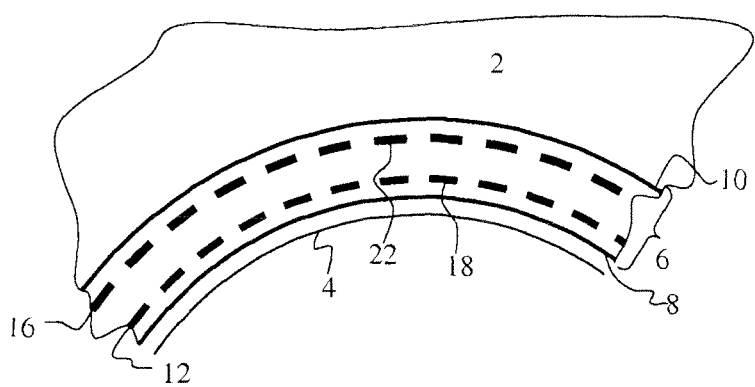
Figure 7C:
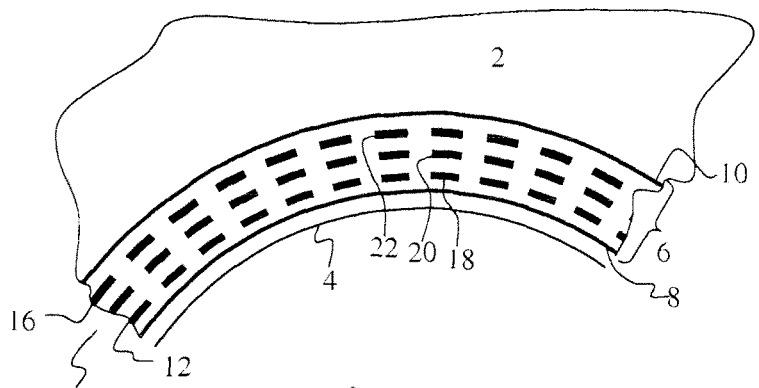

FIGS. 7A to 7C show an embodiment of a gasket according to the invention, which is provided with an arrangement of depressions in the form of bead sections which support the solid bead.

FIGS. 8A to 8D show various possible embodiments and arrangements of depressions in an embodiment of the present invention.

Figure 9A:
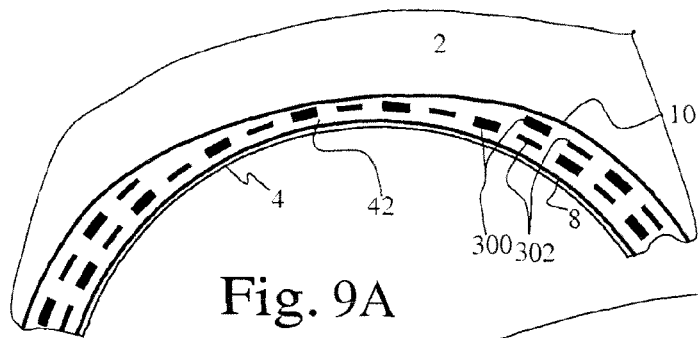
Figure 9B:
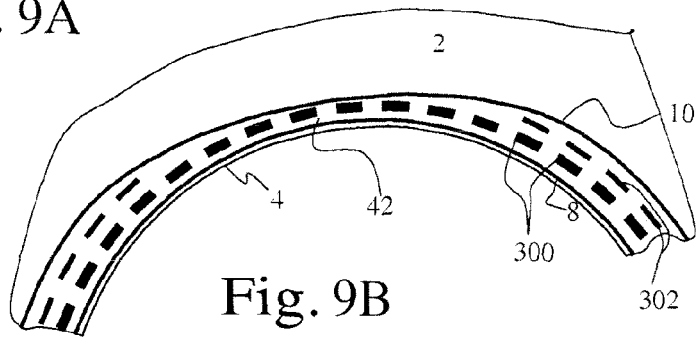

FIGS. 9A and 9B show embodiments of a gasket according to the invention, wherein the depressions are constituted as bead sections having different widths and/or different heights.

Figure 10A:
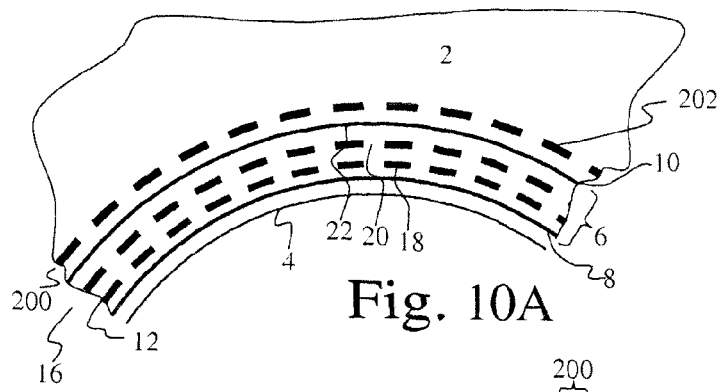
Figure 10B:
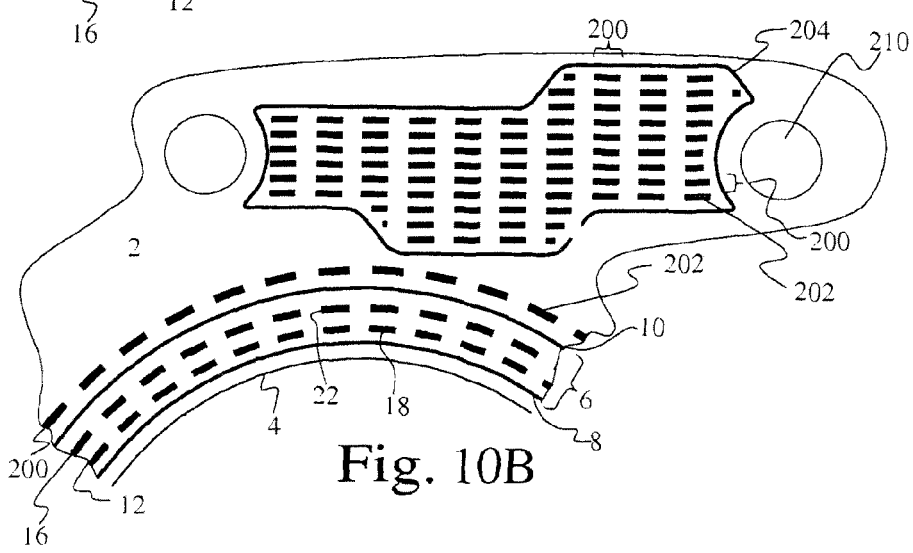

FIGS. 10A and 10B show embodiments of a gasket according to the invention, which is additionally provided with depressions in the "hinterland" of a combustion chamber aperture, in order to limit compression of the gasket also on the side remote from a combustion chamber or a bead sealing a combustion chamber.

DETAILED DESCRIPTION

Figure 1:
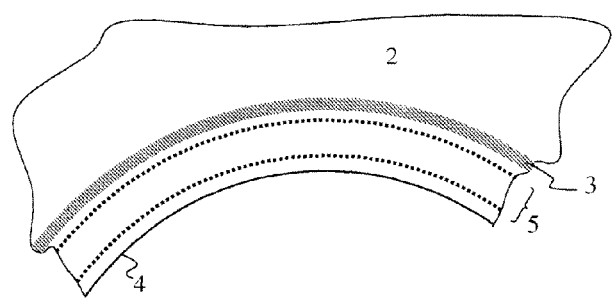
FIG. 1 shows a detail of an embodiment of a conventional cylinder head gasket with a stopper and a sealing region, such as is known from the prior art.

FIG. 1 represents a detail of a conventional flat gasket (cylinder head gasket) with a sealing region 3 and a compression limiter or stopper 5 for an internal combustion engine. Stopper 5 and sealing region 3 run around a combustion chamber aperture edge 4 and each form a circle, which simplifies the production of the tool, since the tool can be produced on a lathe.

Figure 2:
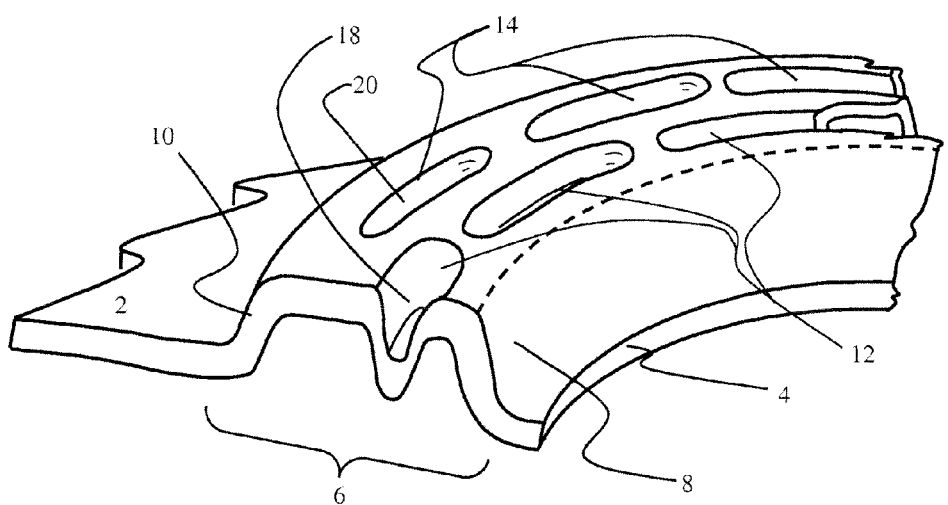
FIG. 2 shows a detail of a flat gasket according to the invention with a solid bead which is supported by two rows of depressions which are constituted as bead sections.

FIG. 2 is a detail of a flat gasket according to the invention (cylinder head gasket) with a layer 2 and a sealing element constituted as a solid bead 6. The solid bead 6 runs with a combustion chamber aperture edge 4 around the combustion chamber aperture. Solid bead 6 comprises an inner flank 8 and an outer flank 10. Represented between flanks 8, 10 on the bead are two rows 12, 14 of depressions 18, 20 constituted as bead sections, which support solid bead 6 in addition to flanks 8, 10 of solid bead 6. Depressions 18, 20 cannot contribute towards the sealing, since regions between the depressions permit a passage of fluid. Individual depressions 18, 20 are disposed offset with respect to one another in rows 12, 14.

FIG. 3A shows a detail of a cylinder head gasket according to the invention for an internal combustion engine in a perspective view. The solid bead points downwards in FIG. 3A and can be seen as a depression between outer flank 10 and inner flank 8 of solid bead 6. Depressions 18 and 20 constituted as bead sections each form an inner row of depressions 18 and an outer row of depressions 20, the rear sides whereof are raised upwards at the base of the bead. Reference number 24 indicates a possible boundary of the gasket or of a sealing region of the gasket. Inside solid bead 6, a combustion chamber aperture edge 4 runs around a combustion chamber aperture.

FIG. 3A' essentially shows the detail of a cylinder head gasket according to the invention from FIG. 3A, with the solid bead which points downwards and which can be seen as a depression between outer flank 10 and inner flank 8 of solid bead 6. As in FIG. 3A, depressions 18 and 20 constituted as bead sections each form an inner row of depressions 18 and an outer row of depressions 20, the rear sides whereof are raised upwards as convexities at the base of the bead. Reference number 24 also indicates a possible boundary of the gasket or of a sealing region of the gasket. Inside solid bead 6, a combustion chamber aperture edge 4 runs around a combustion chamber aperture.

In contrast with FIG. 3A, the depressions (or the represented respective elevations on the rear side of the gasket) of outer row 20 vary in height in FIG. 3A', from small elevations at the upper edge of the figure to more profound depressions at the lower edge of the figure. The depressions (or the represented respective elevations on the rear side of the gasket) of inner row 18 are also represented with a height variation, a large depression (or elevation) 18 alternating with a flat depression (or elevation) in the inner row. It should be made clear that these two principles can be applied to each row of depressions of the other embodiments represented in the drawing. In particular, provision is made to constitute the depressions on the different rows differing in height or flatness or depth.

Figure 3A:
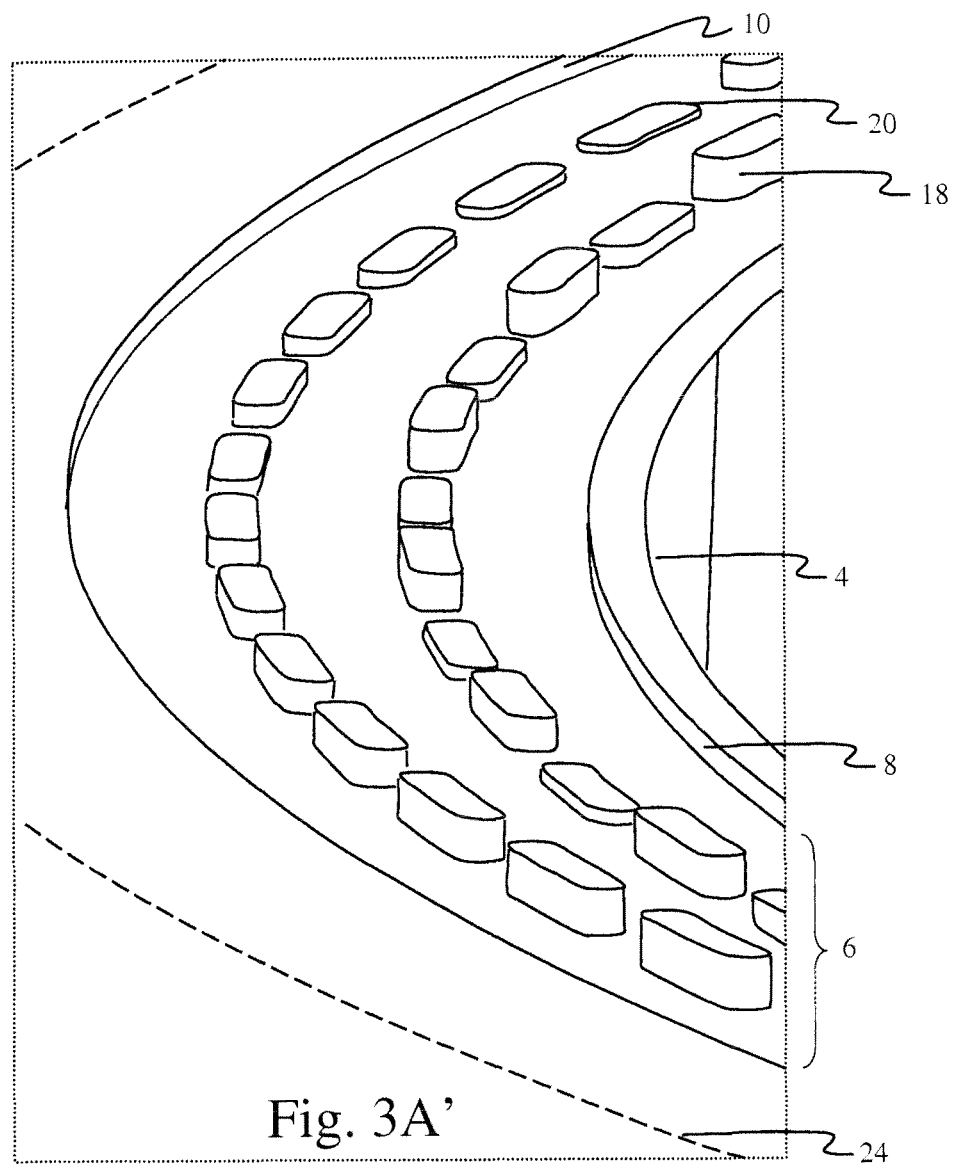
Figure 3B:
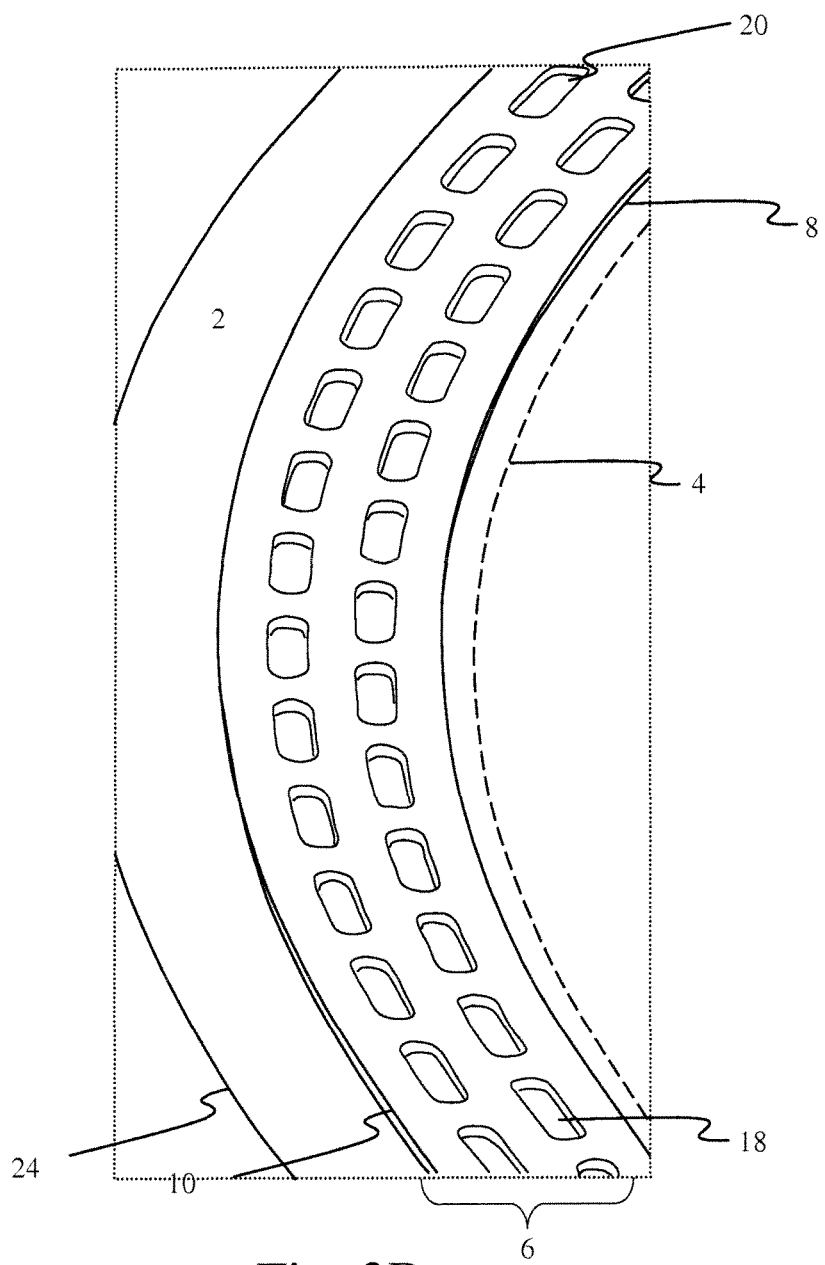

FIG. 3B shows a detail of the gasket of FIG. 3A from the other side. Solid bead 6 is disposed in layer 2. In FIG. 3B, solid bead 6 points upwards and can be seen as an elevation between outer flank 10 and inner flank 8 of solid bead 6. Depressions 18 and 20 constituted as bead sections each form an inner row of depressions 18 and an outer row of depressions 20, which can be seen as depressions on the back of the bead. Reference number 24 indicates a possible boundary of the gasket or of a sealing region of the gasket. Inside solid bead 6, combustion chamber aperture edge 4 runs around a combustion chamber aperture.

FIG. 3C is a side view through layer 2 of solid bead 6 from FIGS. 3A and 3B. Solid bead 6 can be seen in metallic layer 2 with outer flank 10 and inner flank 8. The cross-section runs from combustion chamber aperture edge 4, which surrounds a combustion chamber aperture, radially to the combustion chamber aperture through a region in which an inner depression 18 is overlapped by an outer depression 20.

FIG. 3D is a cross-sectional view through layer 2 of solid bead 6 from FIGS. 3A and 3B. Solid bead 6 can be seen in metallic layer 2 with outer flank 10 and inner flank 8. The cross-section runs from combustion chamber aperture edge 4, which surrounds a combustion chamber aperture, radially to the combustion chamber aperture through a region in which an inner depression 18 extends and in a region 23 between outer depressions 20, which consequently cannot be seen.

Solid bead 6 is constituted in FIGS. 3A to 3D as a trapezoidal solid bead, wherein flanks 8 and 10 of solid bead 6 have a thickness or material thickness that is reduced compared to the thickness of layer 2. The flanks of solid bead 6 are therefore tapered with respect to the thickness of layer 2. Depressions 18, 20 constituted as bead sections are also constituted trapezoidal in FIGS. 3A to 3D, wherein the flanks of depressions 18, 20 have a thickness or material thickness that is reduced compared to the thickness of layer 2. The flanks of depressions 18, 20 are therefore tapered in respect of the thickness of layer 2.

FIG. 4A shows a detail of a cylinder head gasket according to the invention for an internal combustion engine in a perspective view. Solid bead 6 runs in layer 2 and points downwards in FIG. 4A. It can be seen as a depression between outer flank 10 and inner flank 8 of solid bead 6. Depressions 18 and 20 constituted as bead sections each form an inner row of depressions 18 and an outer row of depressions 20, which are raised upwards at the base of the bead. Inside solid bead 6, a combustion chamber aperture edge 4 runs around a combustion chamber aperture. Depressions 18 and depressions 20 of the inner and respectively outer row are disposed in FIG. 4A not offset with respect to one another and parallel or coplanar or coradial.

Figure 4B:
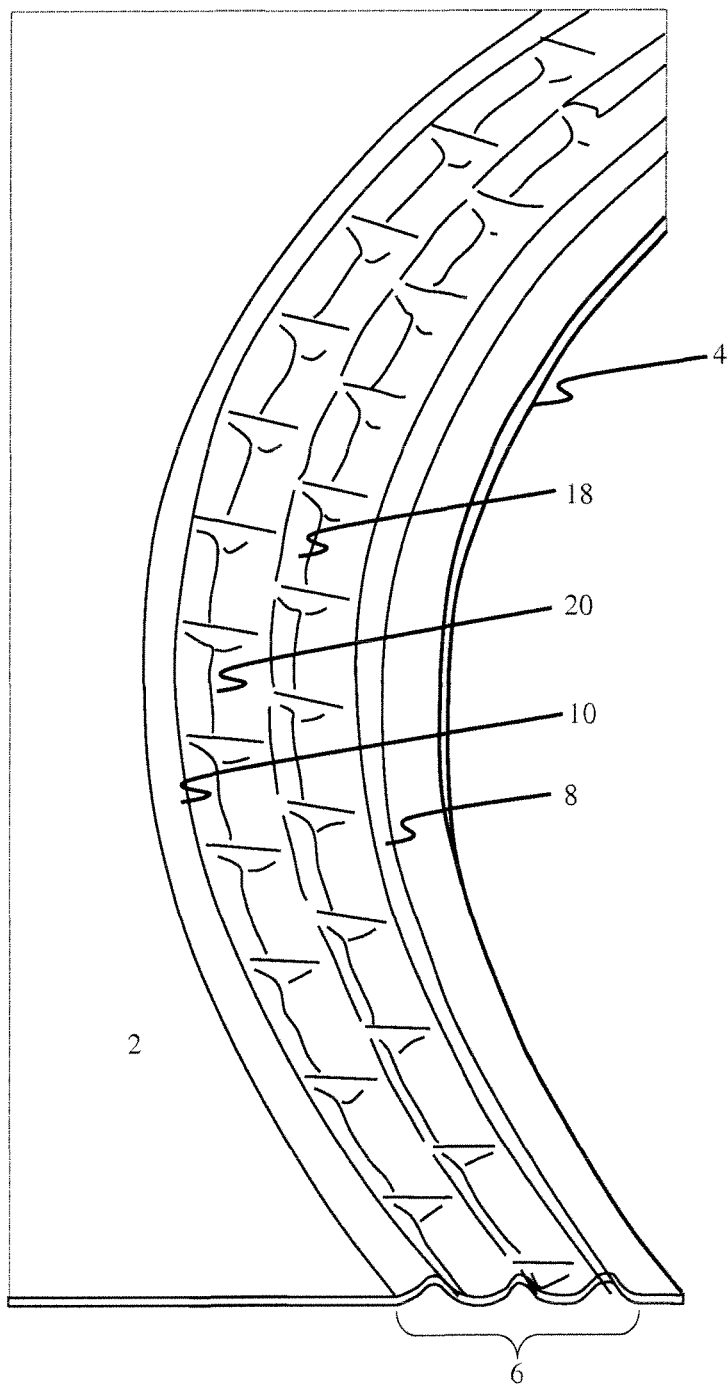

FIG. 4B shows a detail of a gasket as in FIG. 4A from the other side, wherein depressions 18 and depressions 20 of the inner and respectively outer row are disposed offset with respect to one another. Solid bead 6 is disposed in layer 2 and points upwards in FIG. 4B and can be seen as an elevation between outer flank 10 and inner flank 8 of solid bead 6. Depressions 18 and 20 constituted as bead sections each form an inner row of depressions 18 and an outer row of depressions 20, which appear as elevations on the back of the bead. Inside solid bead 6, a combustion chamber aperture edge 4 runs around a combustion chamber aperture.

FIG. 4C is a cross-sectional view through layer 2 of solid bead 6 from FIGS. 4A and 4B. Solid bead 6 can be seen in metallic layer 2 with outer flank 10 and inner flank 8. The cross-section runs from combustion chamber aperture edge 4, which surrounds a combustion chamber aperture, radially to the combustion chamber aperture through a region in which the depression 18 constituted as an inner bead section overlaps with a depression 20 constituted as an outer bead section.

FIG. 4D is a cross-sectional view through layer 2 of solid bead 6 from FIGS. 4A and 4B. Solid bead 6 can be seen in metallic layer 2 with outer flank 10 and inner flank 8. The cross-section runs from combustion chamber aperture edge 4, which surrounds a combustion chamber aperture, radially to the combustion chamber aperture through a region in which depression 18 constituted as an inner bead section extends and in a region 23 between two depressions 20 constituted as outer bead sections, for which reason depressions 20 constituted as outer bead sections cannot be seen.

Solid bead 6 is constituted in FIG. 4A to 4D as a round corrugated solid bead, wherein flanks 8 and 10 of solid bead 6 essentially have a thickness which corresponds to the thickness of layer 2. Provision can however also been made such that the flanks of solid bead 6 are constituted tapered in respect of the thickness of layer 2. Depressions 18, 20, which are fashioned as bead sections, are also constituted corrugated in FIGS. 4A to 4D, wherein the thickness of the flanks of depressions 18, 20 essentially corresponds to the thickness of layer 2. Provision can also be made to constitute the flanks of depressions 18, 20 tapered in respect of the thickness of layer 2.

It should be noted that the flat gasket of the present invention can also be constituted such that, for example, inner flank 10 of solid bead 6 is constituted angular as in FIG. 3D, whilst outer flank 8 is constituted round as in FIG. 4C, or vice versa. Combinations of such trapezoidal and round depressions are also possible in one of the solid beads described above. Provision is also made to use round and trapezoidal depressions alternately in a row of depressions 18, 20. Provision is also made to use depressions with tapered and non-tapered flanks beside one another in a row.

FIG. 5 represents a detail of a flat gasket according to the invention (cylinder head gasket) with a solid bead 6 according to the invention and flanks 8 and 10 in plan view. Disposed on the back of solid bead 6 are three rows 12, 14, 16 of depressions 18, 20, 22 which are formed as bead sections and which run parallel to one another and to solid bead 6. The bead is also able to withstand greater loads as a result of this embodiment, since it is better supported by three rows 12, 14, 16 of depressions 18, 20, than a solid bead with only one row or two rows of depressions.

FIG. 6 represents a detail of a flat gasket according to the invention (cylinder head gasket) with a solid bead 6 with flanks 8 and 10 in plan view. The combustion chamber aperture and therefore also combustion chamber aperture edge 4 comprises a combustion chamber convex portion 42. Solid bead 6 with flanks 8 and 10 essentially runs parallel to combustion chamber aperture edge 4 around combustion chamber convex portion 42. The depressions, which are constituted as bead sections, can also follow parallel to the course of the solid bead. In FIG. 6, rows 12, 14 of bead sections are disposed on circular arcs, which do not run around the combustion chamber convex portion, but rather end before combustion chamber convex portion 42. In the region of combustion chamber convex portion 42, depressions 18, 20 disposed on concentric circular arcs are continued by additional depressions 22 disposed on concentric circular arcs, which in each case extend in the sectors in which the depressions disposed on concentric circular arcs are interrupted by combustion chamber convex portion 42.

If the concentric circular arcs, on which depressions 18, 20, 22 are disposed, are numbered consecutively from the combustion chamber outwards, depressions 18 disposed on the first concentric circular arc are continued by depressions 22 disposed on the third concentric circular arc. In just the same way, depressions 20 disposed on the second concentric circular arc are continued by depressions 22 disposed on the fourth concentric circular arc. As a result of this configuration, any arbitrary form of the course of a solid bead 6 can be filled by correspondingly disposed depressions 18, 20, 22, which are disposed either as in FIG. 3 or 5 on concentric circles according to the course of solid bead 6 on parallel lines.

FIGS. 7A to 7C represent details of a flat gasket according to the invention (cylinder head gasket) with a solid bead 6 and its flanks 8 and 10 in a respective representation in plan view. In FIG. 7A, there is disposed on the back of solid bead 6 a row 14 of depressions 20 constituted as bead sections, which run parallel to solid bead 6. In this embodiment, the bead is also able to withstand greater loads than a solid bead without a row of depressions, since it is easily supported by row 14 of depressions 20.

In FIG. 7B, there are disposed on the back of solid bead 6 two rows 12, 16 of depressions 18, 22 constituted as bead sections, which run parallel to solid bead 6. As a result of this embodiment, the bead is able to withstand greater loads than the embodiment represented in FIG. 7A, since it is supported more sturdily by the two rows 12 and 16 of depressions 18, 20 than the solid bead of FIG. 7A.

In FIG. 7C, there are disposed on the back of solid bead 6 three rows 12, 14, 16 of depressions 18, 20, 22 constituted as bead sections, which run parallel to solid bead 6. As a result of this embodiment, the bead is able to withstand much greater loads than the embodiments represented in FIGS. 7A and 7B, since it is supported much more sturdily by the three rows 12, 14 and 16 of depressions 18, 20, 22 than the embodiments represented in FIGS. 7A and 7B. In the represented embodiment, the bead sections are disposed parallel to one another and not offset with respect to one another.

FIGS. 8A to 8D represent details of a cylinder head gasket according to the invention with a solid bead 6 and flanks 8 and 10 in a respective representation in plan view.

Figure 8A:
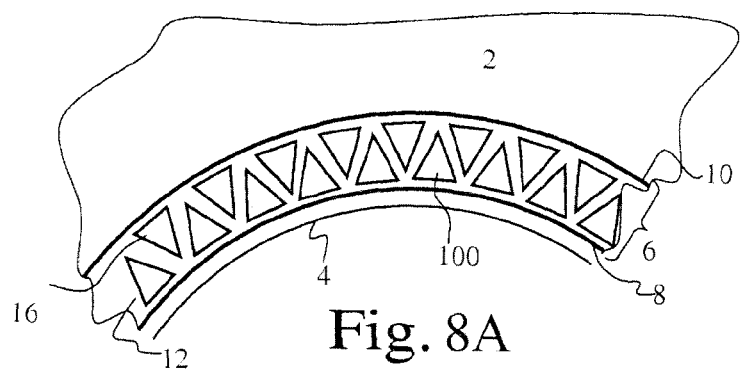

In FIG. 8A, there are disposed on the back of solid bead 6 two rows 12, 16 of depressions 100 constituted as triangles, which run parallel to solid bead 6. The tips of triangular depressions 100 of outer row 16 point inwards, and the tips of triangular depressions 100 of inner row 12 point outwards. Non-elongated depressions 100 thus form two parallel rows of depressions, which lies so close beside one another that they could also be interpreted as a single row of depressions.

Figure 8B:
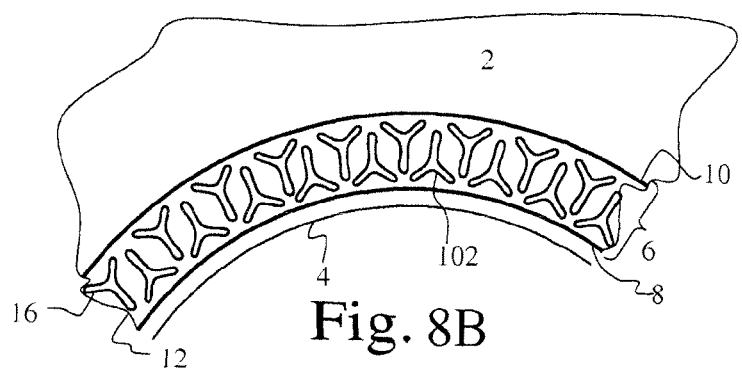

FIG. 8B essentially corresponds to FIG. 8A, with the difference that the depressions are not triangular, but form Y-beads 102. If only the points of intersection of Y-beads 102 are considered in each case, two rows of non-elongated depressions 100 disposed offset with respect to one another arise. It is however also possible to see only one row of Y-beads 102, if in each case one considers only the outer and inner boundaries of the respective rows of Y-beads 102, the latter overlapping one another for the most part.

Figure 8C:
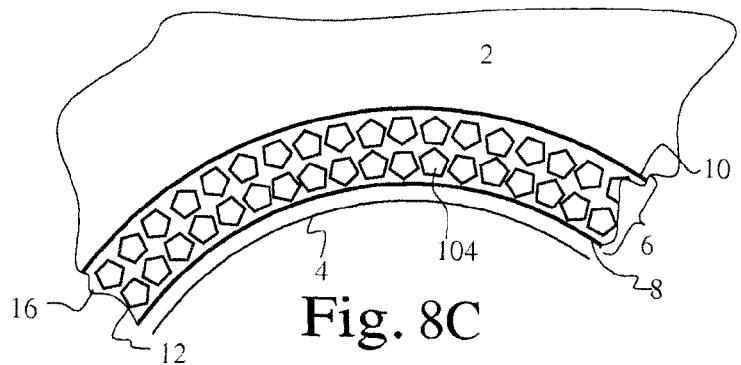

The representation of FIG. 8C essentially corresponds to those of FIGS. 8A and 8B. In contrast with triangular depressions 100 and Y-beads 102, the depressions form heptagons 104. Non-elongated heptagons 104 in each case point with a tip alternately inwards and outwards. The two rows 12, 16 of heptagonal depressions 104 are clearly separated from one another. Heptagonal depressions 104 are disposed in each case not offset with respect to the corresponding depression of the other row. It is also possible to use heptagonal depressions that are not formed regularly, in order to achieve a more uniform filling of the solid bead.

Figure 8D:
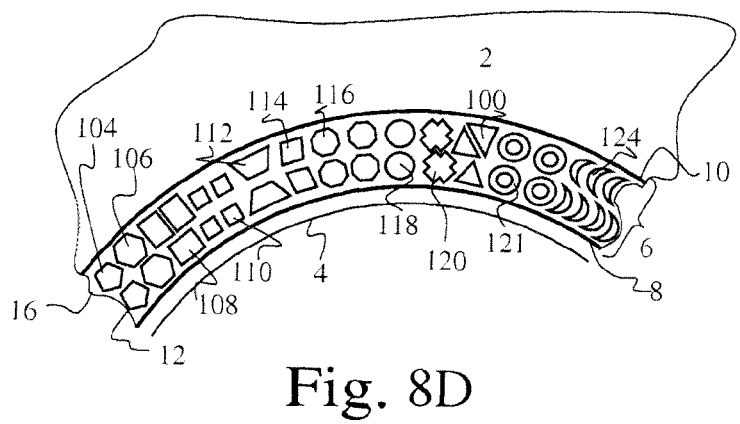

FIG. 8D represents a collection of different shapes of depressions, from which a row of depressions can be composed in each case. Inner and outer row 12, 16 comprise successively heptagonal depressions 104, hexagonal depressions 106, rectangular depressions 108, square depressions 110, as well as trapezoidal depressions 112 and diamond-shaped depressions 114. Rows 12 and 16 further comprise octagonal depressions 116, round depressions or point-like beads 118, cross-shaped beads 120, triangular depressions 100, circular depressions or annular beads 121 as well as half-moon depressions and half-moon beads 124. The two rows 12, 16 are also clearly separated from one another here. It is clear that each individual row of depressions can also comprise only one type of the aforementioned depressions. It is for example possible to form the inner row of depressions from annular depressions or annular beads 121 and the outer row of depressions from point-like beads 118. It is also possible, as represented, to select different kinds and sizes of depressions within a row of depressions and, for example, to change from point-like beads through octagonal depressions on to annular beads 121.

FIGS. 9A and 9B represent in each case a detail of two different embodiments of a flat gasket according to the invention.

FIGS. 9A and 9B each represent a detail of a flat gasket according to the invention (cylinder head gasket) with a solid bead 6 with flanks 8 and 10 in plan view. Solid bead 6 is constituted narrower in the represented region, such as may be necessary for example in the case of cylinder head gaskets between the combustion chamber apertures of multi-cylinder engines. Solid bead 6 comprises a narrow region, in which outer flank 10 diverges from the circular shape in the direction of a lower flank 8. The inner flank essentially runs parallel to combustion chamber aperture edge 4 around combustion chamber convex portion 42. The depressions of the inner row are constituted as bead sections and run parallel to inner flank 8 of solid bead 6. The outer row of depressions runs for the most part parallel to outer flank 10 of solid bead 6, but ends before the narrow region. The outer row of depressions is interrupted in a sector in the narrow region.

In FIG. 9A, the depressions of the inner row and the outer row are constituted as bead sections. The two rows each comprise alternately wide depressions 300 and narrow depressions 302. The depressions of the inner row and of the outer row run parallel to one another, and are not offset with respect to one another.

In FIG. 9B, the depressions of the inner row and the outer row are constituted as bead sections. The depressions of the inner row comprise only wide depressions 300. The depressions of the outer row comprise only narrow depressions 302. The depressions of the inner row and the outer row are also aligned parallel to one another in FIG. 9B, i.e. they are not disposed offset with respect to one another and overlap when viewed from the cylinder midpoint.

The support of the solid bead can be controlled in a targeted manner by this design. In particular, it is intended to vary the height or the depth of the depressions together with the width or length of the depressions in order to achieve a desired support of solid bead 6.

FIGS. 10A and 10B represent details of a flat gasket according to the invention (cylinder head gasket) with a solid bead 6 with its flanks. The embodiments represented in FIGS. 10A and 10B additionally comprise at least one row of depressions which are not disposed between the flanks of a solid bead.

The gasket represented in FIG. 10A essentially corresponds to the gasket such as is represented in FIG. 7C, with a solid bead which is supported by two rows 10, 16 of depressions 18, 22. In addition, there is disposed in FIG. 10 a row 200 of depressions 202, which however point in the other direction, and here do not support the back of the solid bead, but rather support the base of the solid bead against the latter being able to deviate upwards. Depressions 18 and 22 are pressed into the layer of the gasket in order to support the latter, said depressions being pressed opposite to the direction in which the solid bead is formed. Depressions 202 are pressed into the layer of the gasket in order to support the latter, said depressions being pressed opposite to the direction in which the solid bead is formed. Depressions 202 are pressed or formed in the same direction as solid bead 6 in order to provide additional support for the base of flank 10 of solid bead 6 in the opposite direction.

FIG. 10B represents a larger detail of the gasket from FIG. 10A, which is additionally provided with a "hinterland stopper". In FIG. 10B, further additional rows 200 of depressions 202 are disposed on the gasket, which are not disposed between the flanks of a solid bead 6. In region 204, a plurality of depressions 202 disposed one behind the other and beside one another is disposed along a plurality of lines 200 running essentially in parallel. Region 204 can be surrounded by a half-bead and extends for example between two bolt holes 210. The depressions on adjacent lines can, as represented, each be disposed in parallel and not offset with respect to one another. The depressions on adjacent lines can each be disposed offset with respect to one another. The individual depressions can thus fill an area of a layer of the metallic flat gasket, which can in principle be arbitrarily shaped. It is also possible to dispose rows 200 of depressions 202 along a curve.

The gaskets represented in FIGS. 2 to 6 can be produced with a tool which for the most part can be produced on a lathe.

It is further pointed out that all the combinations of the features of FIGS. 2 to 10b are to be regarded as being disclosed.

The invention claimed is:

1. A purely metallic flat gasket, with at least one metallic layer, wherein the metallic gasket comprises at least one full sealing bead which is formed by said at least one layer of the metallic gasket, wherein the full sealing bead comprises an inner flank and an outer flank lying opposite one another, and wherein, radially between the inner flank and outer flank in the circumferential direction of the full sealing bead, there are provided at least two rows of bead sections radially adjacent to one another and embossed in the full sealing bead and formed by the at least one metallic layer, said bead sections forming depressions wherein the full sealing bead and the rows of depressions run at least partially in a circular arc, wherein each said row comprises between 50 and 180 depressions, said bead sections each forming a concavity on the one side of the layer and a respective convexity on the other side of the layer, wherein the bead sections each form an integral contour with the full sealing bead and the convexities of the bead sections are orientated in the opposite direction with respect to the convexity of the full sealing bead, and further wherein the bead sections support the full sealing bead in such manner as to prevent complete flattening of the full sealing bead under an applied compression force, and wherein the depressions in one of said rows are parallel and not offset with respect to the depressions in the other of said rows.

2. The metallic flat gasket according to claim 1, wherein the depressions that run at least partially in a circular arc essentially have a length which corresponds to a center-point angle of between 2° and 4°.

3. The metallic flat gasket according to claim 1, wherein the height and/or the width of the depressions in at least one of said at least two rows of depressions changes along said at least one row.

4. The metallic flat gasket according to claim 1, wherein the depressions are corrugated in cross-section.

5. The metallic flat gasket according to claim 1, wherein the depressions are tapered in the region of their flanks compared to the thickness of the metallic layer.

6. The metallic flat gasket according to claim 1, wherein the depressions are trapezoidal in cross-section.

7. The metallic flat gasket according to claim 1, further comprising at least one combustion chamber aperture, which is surrounded by said full sealing bead and the at least one row of depressions.

8. The metallic flat gasket according to claim 1, comprising at least one further row of depressions which are not disposed between the flanks of a full sealing bead.

9. The metallic flat gasket according to claim 1, wherein the metallic flat gasket is a cylinder head gasket.

10. A pressing/embossing tool for producing a metallic flat gasket with a full bead according to claim 1.

11. A metallic flat gasket, with at least one metallic layer, wherein the metallic gasket comprises at least one full sealing bead which is formed by said at least one layer of the metallic gasket, wherein the full sealing bead comprises an inner flank and an outer flank lying in a radial direction opposite one another, and wherein between the inner and outer flanks in the circumferential direction of the full sealing bead, there are provided at least two rows of a plurality of openly exposed bead sections circumferentially spaced adjacent to one another and embossed in the full sealing bead and formed by the at least one metallic layer, said bead sections forming depressions, wherein each said row comprises between 50 and 180 depressions, with each of said depressions having a length extending in a circular arc and having a radially extending width that is between 2 to 8 times less than said length, said bead sections each forming an openly exposed concavity on the one side of the layer and a respective openly exposed convexity on the other side of the layer, wherein the bead sections each form an integral contour with the full sealing bead and the convexities of the bead sections are orientated in the opposite direction with respect to the convexity of the full sealing bead, and further wherein the bead sections support the full sealing bead in such manner as to prevent complete flattening of the full sealing bead under an applied compression force, and wherein the depressions in one of said rows are parallel and not offset with respect to the depressions in the other of said rows.

12. The metallic flat gasket according to claim 11, wherein the radially extending width is between 3 to 6 times less than said length.

13. The metallic flat gasket according to claim 11, wherein the radially extending width is between 4 to 5 times less than said length.

* * * * *

UNITED STATES PATENT AND TRADEMARK OFFICE
CERTIFICATE OF CORRECTION

PATENT NO. : 9,822,879 B2
APPLICATION NO. : 13/379112
DATED : November 21, 2017
INVENTOR(S) : Klaus Schmitt and Burkhard Schneider Page 1 of 1

It is certified that error appears in the above-identified patent and that said Letters Patent is hereby corrected as shown below:

In the Specification

Column 7, Line 57 "18, 20, than" should read --18, 20, 22 than--

Signed and Sealed this
Sixth Day of March, 2018

Andrei Iancu
*Director of the United States Patent and Trademark Office*